Dec. 18, 1928.

O. DÖBELE

DENTAL PLATE WITH SUCKER

Filed Oct. 7, 1927

1,696,110

Inventor
Otto Döbele
By Herbert C. Smith
Attorney

Patented Dec. 18, 1928.

1,696,110

UNITED STATES PATENT OFFICE.

OTTO DÖBELE, OF CONSTANCE, GERMANY.

DENTAL PLATE WITH SUCKER.

Application filed October 7, 1927, Serial No. 224,682, and in Germany July 23, 1926.

My present invention relates to an improved dental plate with sucker and is designed for the purpose of providing means whereby a dental plate may with comfort and convenience be retained in the mouth.

In carrying out my invention, I employ a flexible membrane in the dental plate by means of which the dental plate may be retained in close relationship to the roof of the mouth or with the lower jaw portion of the mouth as the case may be. The invention consists in certain novel combinations and arrangements of parts as will hereinafter be more fully set forth and claimed.

In the accompanying drawings, I have illustrated one complete example of the physical embodiment of my invention wherein the parts are combined and arranged according to the best mode I have so far devised for the practical application of the principles of my invention. While I have illustrated the invention in connection with a dental plate for use in the roof of the mouth, it will be apparent that the device of my invention may be embodied in a dental plate to be used in the lower part of the mouth as well as in an upper dental plate.

Figure 1:
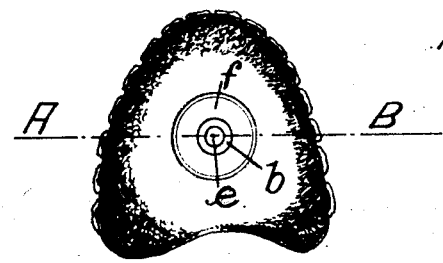
Figure 1 is a top plan view of a dental plate showing the device of my invention.
Figure 2:
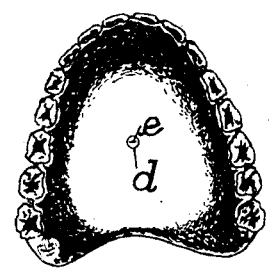
Fig. 2 is a bottom plan view of the dental plate.
Figure 3:
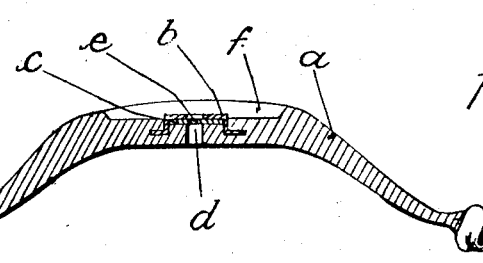
Fig. 3 is an enlarged transverse sectional view at line A—B of Fig. 1.
Figure 4:
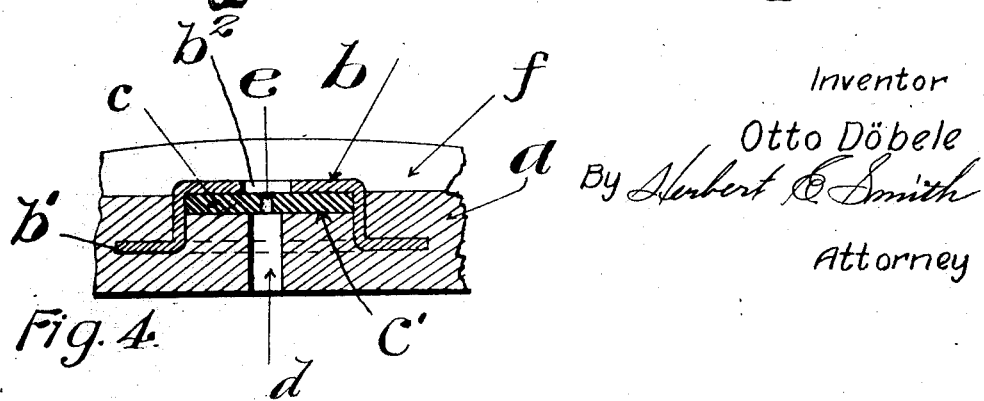
Fig. 4 is a still further enlarged detail sectional view at the central portion of the dental plate.

In carrying out my invention, I utilize a standard form of dental plate as $a$ which is made of suitable material and this dental plate is fashioned with a membrane holder $b$ which is cast or otherwise incased within the body of the dental plate. This membrane holder $b$ is in the form of an inverted cup having a flange $b'$ and an opening $b^2$. The portion of the holder having the opening $b^2$ projects above the surface of the plate as seen in Fig. 4. The holder is designed to retain a flexible membrane $c$, the latter being fashioned of suitable material located within a cavity $c'$ formed in the upper face of the dental plate $a$. Preferably the membrane $c$ is in the form of a circular disk and it is fashioned with a perforation $e$ at its center which, as shown, is exposed through the open center $b^2$ of the membrane holder. The membrane and the holder are located at approximately a central point in the dental plate and the latter is fashioned with a hole $d$ extending therethrough, above which the perforation $e$ of the membrane is located. In the top face of the dental plate, a cavity $f$ is provided, which cavity is of circular shape and although quite shallow, is of sufficient depth to provide for the accommodation of the membrane $c$ and its holder $b$.

It will be apparent that the dental plate is applied to the roof of the mouth in usual manner, and the tongue then applied to the underside of the dental plate to force the latter in close contact with the roof of the mouth. By withdrawing the tongue from the plate, a suction effect is produced and the air contained in the cavity $f$ is withdrawn from the cavity $f$ through the hole $d$, perforation $e$ and the open center $b^2$, and thereafter the perforation $e$ closes, due to the inherent flexibility of the membrane, thus firmly holding the plate in position. In this manner, the dental plate is retained by suction in proper position in the roof of the mouth and may be used with comfort and convenience.

Having thus fully described my invention, what I claim as new and desire to secure by Letters Patent is—

1. In combination, a dental plate having a cavity, a membrane holder embedded in the plate, a suction membrane retained between the holder and plate, said holder having an opening therein, said membrane having a perforation in the portion exposed through the opening in the holder and said perforation being adapted to open to permit withdrawal of air from the cavity and being self-closing to prevent the subsequent return of air to said cavity.

2. In combination, a dental plate having a cavity and an opening in the bottom thereof, a membrane closing said opening and provided with a perforation forming a passage to permit withdrawal of air from the cavity and being self-closing to prevent the subsequent return of air to the cavity.

In testimony whereof I affix my signature.

OTTO DÖBELE.